3,270,008
NOVEL PROCESS FOR 3-OXO-Δ⁴,⁶ STEROIDS
Hugh L. Dryden, Jr., Chicago, and Max J. Kalm, Wilmette, Ill., assignors to G. D. Searle & Co., Chicago, Ill., a corporation of Delaware
No Drawing. Filed Sept. 30, 1964, Ser. No. 400,560
Claims priority, application Great Britain, Oct. 1, 1963, 38,682/63
20 Claims. (Cl. 260—239.55)

This invention relates to a novel process for preparing 3-oxo-Δ⁴,⁶ steroids. More particularly, this invention relates to a new, useful, unobvious, and widely-applicable process for preparing, in one step, steroids of the general formula in rings A and B

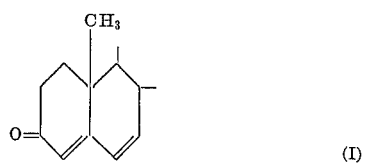

from corresponding 3-hydroxy-Δ⁵ steroids, or the 3-alkanoates or 3-alkyl ethers thereof 3-oxo-Δ⁴,⁶ steroids are characterized by valuable pharmacological properties which include anabolic, androgenic, progestational, and anti-mineralocorticoid activity. Additionally, 3-oxo-Δ⁴,⁶ steroids serve as intermediates for the preparation of other compounds having valuable pharmacological properties. A typical example of the aforesaid utility is the capacity of 3(17β-hydroxy-3-oxoandrosta-4,6-dien-17α-yl)propionic acid lactone (U.S. 2,900,383) to block the effects of desoxycorticosterone acetate on urinary sodium and potassium, and the fact that 3-(17β-hydroxy-3-oxoandrosta-4,6-dien-17α - yl)propionic acid lactone reacts with thioacetic acid to give 3-(7α-acetylthio-17β-hydroxy-3-oxoandrost-4-en-17α - yl)propionic acid lactone (U.S. 3,013,012), an anti-mineralocorticoid marketed as Aldactone-A® by G. D. Searle & Co., of Chicago, Illinois.

The process to which this invention relates is distinguished from the prior art in one or more of the following particulars:

(1) It makes use of relatively inexpensive and readily available 3-oxy-Δ⁵ steroids as starting materials.

(2) It proceeds in one step, and thus requires a minimum of manipulations.

(3) It affords high yields.

(4) It is relatively free from undesirable side reactions, especially those involving functional centers in the starting material other than the 3-oxy group and the double bond at 5.

Among the various prior art processes of preparing 3-oxo-Δ⁴,⁶ steroids, one heretofore preferred procedure is to contact a 3-hydroxy-Δ⁵ steroid with manganese dioxide. However, this process is frequently undesirable because of low yields (illustratively of the order of 30%) and the susceptibility of such common substituents as a 17β-hydroxyl, or a secondary hydroxyl in any position, to degradative attack under the conditons of the reaction. Moreover, the process is inconvenient in that it requires the use of a difficultly standardized grade of manganese dioxide.

Another one-step method of preparing 3-oxo-Δ⁴,⁶ steroids is the so-called Wettstein-Oppenauer oxidation of a 3-hydroxy-Δ⁵ steroid with a benzoquinone and an aluminum alkoxide. This process suffers from two of the same defects which characterize the manganese dioxide process, viz., low yields (of the order of 40–50% under optimum conditions) and side reactions (e.g., formation of tarry materials attributed to use of the benzoquinone, and unselective oxidation of primary and secondary hydroxyls present).

A multi-step method of preparing 3-oxo-Δ⁴,⁶ steroids comprises brominating a 3-hydroxy-Δ⁵ steroid, oxidizing the resultant 3-hydroxy-5,6-dibromo compound to the corresponding 3-oxo derivative with chromium trioxide, and then dehydrobrominating. This process is undesirable because of the multiple manipulations inherent in its three steps, and such side reactions as (a) unselective bromination of double bonds present, (b) unselective oxidation of primary and secondary hydroxyls present, and (c) tar formation during dehydrobromination.

Other multi-step procedures for preparing 3-oxo-Δ⁴,⁶ steroids require the use of a 3-oxo-Δ⁴ intermediate, which is prepared by oxidizing a 3-hydroxy-Δ⁵ steroid with an aluminum alkoxide under Oppenauer conditions. The 3-oxo-Δ⁴ intermediate is then converted to a 3-oxo-Δ⁴,⁶ steroid by a variety of procedures, e.g., chloranil or manganese dioxide dehydrogenation, or bromination followed by dehydrobromination. Since the Oppenauer oxidation results in yields of approximately 80%, and since yields of known procedures for transformation of 3-oxo-Δ⁴ intermediates to 3-oxo-Δ⁴,⁶ steroids are generally less than 80%, overall yields are seldom greater than 60%. Moreover such multi-step, low yield procedures, to the extent that a benzoquinone (e.g., chloranil), manganese dioxide, bromination, and/or dehydrobromination are involved, are subject to the deleterious side reactions characteristic thereof described above.

It has now been found—in accordance with the present invention—that when at least about 4 gram-atoms of bromine per mole of steroid of Formula II below is contacted with a mixture of:

(a) A 3-oxy-Δ⁵ steroid having the general formula in rings A and B

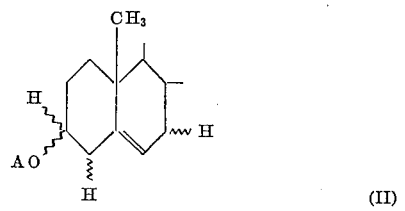

wherein A represents a (desirably) lower alkanoyl or lower alkyl radical or, preferably, hydrogen and the grouping symbolized by —OA is preferably in β-configuration;

(b) A solvent medium relatively inert to the reactants;
(c) A hydrogen bromide acceptor; and, desirably but not necessarily,
(d) An inorganic bromide salt the corresponding 3-oxo-Δ⁴,⁶ steroid of general Formula I is formed. Under optimum conditions, the yields obtained via this one-step procedure are unusually high; and no appreciable side reactions occur, as evidenced both by the absence of tarry oxidation products and the purity of the resulting products. Specifically, functional centers other than those called for by Formula II of the steroidal starting material, and which include, i.a., primary and secondary hydroxy, oxo, acetyl, epoxy, alkanoyloxy, alkenyl, alkynyl, hydroxyalkynyl, and/or spirolactone groups; the ring system typical of the spirostane series; the 17-alkyl side chain typical of the cholestane series; and/or an endocyclic carbon-carbon unsaturated linkage in the D ring do not give rise to the side reactions which one would anticipate if these functional centers were present in prior art reaction mixtures.

The starting materials for use in this process represented by the general Formula II include, but are not limited to, those of the pregnane, androstane, cholestane, and spirostane series, and can contain further substituents in one or more of the positions 1, 2, 4, 6, 7, 8, 9, 11, 12, 14, 15, 16, 17, and 18, as also in the 17-substituent itself, if any. Moreover, the starting materials can contain nuclear unsaturated linkages in the C and D rings.

Because it affords 3-(17β-hydroxy-3-oxoandrosta-4,6-dien-17α-yl)propionic acid lactone in especially high yields, a particularly suitable starting material is 3-(3β,17β-dihydroxyandrost-5-en-17α-yl)propionic acid lactone. Other optimal starting materials of the androstane series are those having the formula

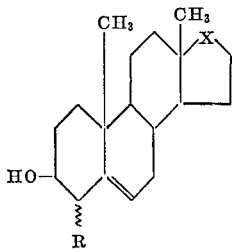

wherein X represents a carbonyl, β-hydroxymethylene, α-alkynyl-β-hydroxymethylene, α-alkenyl-β-hydroxymethylene, α-alkyl-β-hydroxymethylene, α-hydroxyalkynyl-β-hydroxymethylene, or α-carboxyethynyl-β-hydroxymethylene radical and R represents hydrogen or a methyl radical. Among the alkyl, alkenyl, and alkynyl moieties which comprise the various radicals represented by X, those containing fewer than 7 carbon atoms are preferred.

Optimal starting materials of the pregnane series include those having the formula

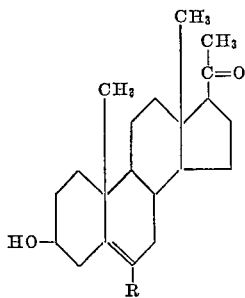

wherein R represents hydrogen or a methyl radical, and 17α-alkanoyloxy, 16,17-dehydro, or 16α,17α-epoxy analogs thereof otherwise identical.

The amount of bromine required for the reaction whereby this process proceeds is, as aforesaid, a minimum of approximately 4 gram-atoms per mole of steroidal starting material; but to compensate for any interaction between bromine and the solvent medium used, amounts in excess of 4 gram-atoms are sometimes advantageous. Thus, when N,N-dimethylformamide is the medium, approximately 4.4 gram-atoms of bromine per mole of steroidal starting material is preferred for optimum yields. The bromine can be introduced to the reaction mixture either per se or dissolved in a relatively inert solvent. Solvents especially suitable for incorporation of the bromine are ethers such as dioxane. Other obviously suitable solvents include N-substituted amides such as N-methyl-2-pyrrolidone and N,N-dimethylformamide. Yields are generally improved if the bromine is added portionwise to the mixture containing the Δ⁵ steroidal starting material, and optimum yields are realized when such portionwise addition is consummated in not less than 25–45 minutes where the reaction mixture is maintained in the preferred temperature range of 75–105° C. discussed below. Addition times longer than 45 minutes do not adversely affect yields.

Although the instant process can be carried out at room temperatures; better yields result if elevated temperatures are maintained during bromine addition. Suitable elevated temperatures include those from 35 to 115° C., with 75 to 105° C. being perhaps optimum. It is not necessary to discontinue elevated temperatures upon conclusion of the bromine addition; indeed, upon continued heating for a short period of time (e.g., ½ to 2 hours) tends to assure that the reaction is complete.

The hydrogen bromide acceptor employed in the reaction mixture should be inert to the reactants and capable of removing from the solution the hydrogen bromide formed in process. Especially useful acceptors are alkali and alkaline earth carbonates, e.g., lithium or calcium carbonate, and magnesium oxide. Aromatic bases such as pyridine and quinoline also serve. The amount of hydrogen bromide acceptor employed is commonly one equivalent per mole of hydrogen bromide formed, but more than one equivalent can be used to hasten HBr removal.

The reaction medium should be a solvent or solvents relatively inert to the reactants, as aforesaid, and it is desirable that the boiling point be no lower than 105° C. in order to take advantage of the preferred 75–105° C. temperature range. Solvents especially adapted to meet these criteria are N-substituted amides such as N,N-dimethylformamide, N,N - dimethylacetamide, N,N - diethylacetamide, N-methyl-2-pyrrolidone, and N-formylpiperidine. Various amounts of solvent can be used, optimal amounts being largely conditioned by the particular reactants and temperatures involved. Illustratively, the preparation of 3-(17β-hydroxy-3-oxoandrosta-4,6-dien-17α-yl)propionic acid lactone from 3-(3β,17β dihydroxyandrost-5-en-17α-yl)propionic acid lactone using lithium carbonate as the hydrogen bromide acceptor, N,N-dimethylformamide as solvent, and lithium bromide as the bromide salt, is perhaps most advantageously carried out at 75° C. in roughly 5 to 50 volumes of solvent.

The incorporation of an inorganic bromide salt in the reaction mixture can increase yields by as much as 10%. Since it is preferable that the salt of choice be soluble in the reaction medium, lithium bromide is particularly desirable when the medium is an N-substituted amide. Though the amount of salt to be used will vary with specific reactants and reaction conditions, the 50 grams of lithium bromide per liter of N,N-dimethylformamide found to be optimum where the latter material constitutes the reaction medium can be taken as representative.

The following examples describe in detail divers applications of the process of this invention in illustrative situations. However, the invention is not to be construed as limited thereby, either in spirit or in scope, since it will be apparent to those skilled in the art that many modifications, both of materials and of methods, may be practiced without departing from the purpose and intent of this disclosure. In the examples hereinafter set forth, temperatures are given in degrees centigrade and relative amounts of materials in parts by weight, except as otherwise noted. Yields are percent of theory, based on the amount of 3-oxo-Δ⁴,⁶ steroid in the crude product as determined by its ultraviolet spectrum,

*Example 1*

To a suspension of 300 parts of 3-(3β,17β-dihydroxyandrost-5-en-17α-yl)propionic acid lactone and 378 parts of lithium carbonate in 2300 parts of N-methyl-2-pyrrolidone at 75–79° is added, portionwise with stirring during approximately 30 minutes, a solution of 306 parts of bromine and 189 parts of lithium bromide in 710 parts of N,N-dimethylformamide. Upon completion of the addition, stirring at 75–79° is continued for about 1 hour, whereupon the reaction mixture is cooled to room temperature and then poured into a mixture of 3,000 parts of concentrated hydrochloric acid and 5500 parts of ice. The resultant mixture is extracted with a 1:5 mixture of dichloromethane and ether. The extract is washed with water, dried over anhydrous sodium sulfate containing decolorizing charcoal, and filtered. The filtrate is freed of solvent by vacuum distillation and the residue taken up in benzene containing a small amount of Raney nickel. The mixture thus obtained is stirred at room temperatures for around 4½ hours and then filtered.

The filtrate, distilled to dryness in vacuo, affords an 87% yield of 3-(17β-hydroxy-3-oxoandrosta-4,6-dien-17α-yl) propionic acid lactone.

*Example 2*

To a suspension of 50 parts of 3-(3β,17β-dihydroxy-androst-5-en-17α-yl)propionic acid lactone, 64 parts of lithium carbonate, and 64 parts of lithium bromide in 945 parts of N,N-dimethylformamide at 75–80° is added, portionwise with stirring during approximately 45 minutes, a solution of approximately 46 parts of bromine in 330 parts of dioxane. Stirring at 75–80° is continued for about 2 hours after addition of the bromine is complete, at which point approximately 5000 parts of warm water is introduced. The resultant mixture is cooled at 5–10° while sufficient glacial acetic acid is slowly added to neutralize excess lithium carbonate. The precipitate which forms is isolated by filtration and washed with water, then dried in vacuo to afford 3-(17β-hydroxy-3-oxoandrosta-4,6-dien-17α-yl)propionic acid lactone which, upon recrystallization from ethyl acetate, melts at 163–165°.

*Example 3*

To a suspension of 300 parts of 3-(3β,17β-dihydroxy-androst-5-en-17α-yl)propionic acid lactone, 208 parts of magnesium oxide, and 400 parts of lithium bromide in 5670 parts of N,N-dimethylformamide at 95–100° is added, portionwise with stirring during approximately 45 minutes, a solution of 296 parts of bromine in 2070 parts of dioxane. Stirring at 95–100° is continued for about 1½ hours after addition of the bromine solution is complete, at which point the bulk of the solvent is removed under reduced pressure and the residue then cooled and consecutively diluted with 1000 parts of water, 1340 parts of dichloromethane, and 7130 parts of ether. Approximately 2620 parts of 10% hydrochloric acid is thereupon cautiously mixed in. The organic layer is separated, washed with water, dried over anhydrous sodium sulfate, and filtered. The filtrate, freed of solvent by vacuum distillation, affords 3-(17β-hydroxy-3-oxoandrosta-4,6-dien-17α-yl)propionic acid lactone in 82% yield.

*Example 4*

Substitution of 278 parts of bromine for the 296 parts of bromine called for in Example 3 affords, by the procedure there detailed, an 81% yield of 3-(17β-hydroxy-3-oxoandrosta-4,6-dien-17α-yl)propionic acid lactone.

*Example 5*

Substitution of 288 parts of bromine for the 296 parts of bromine called for in Example 3 affords, by the procedure there detailed, an 83% yield of 3-(17β-hydroxy-3-oxoandrosta-4,6-dien-17α-yl)propionic acid lactone.

*Example 6*

Substitution of 306 parts of bromine for the 296 parts of bromine called for in Example 3 affords, by the procedure there detailed, an 85% yield of 3-(17β-hydroxy-3-oxoandrosta-4,6-dien-17α-yl)propionic acid lactone.

*Example 7*

Substitution of 320 parts of bromine for the 296 parts of bromine called for in Example 3 affords, by the procedure there detailed, an 82% yield of 3-(17β-hydroxy-3-oxoandrosta-4,6-dien-17α-yl)propionic acid lactone.

*Example 8*

To a suspension of 300 parts of 3-(3β,17β-dihydroxy-androst-5-en-17α-yl)propionic acid lactone, 385 parts of lithium carbonate, and 400 parts of lithium bromide in 1890 parts of N,N-dimethylformamide at around 75° is added, portionwise with stirring during approximately 45 minutes, a solution of 296 parts of bromine in 2070 parts of dioxane. Stirring at around 75° is continued for about 1½ hours after addition of the bromine solution is complete, at which point the bulk of the solvent is removed under reduced pressure and the residue then cooled and consecutively diluted with 1000 parts of water, 1340 parts of dichloromethane, and 7130 parts of ether. Approximately 2620 parts of 10% hydrochloric acid is thereupon cautiously mixed in. The organic layer is separated, washed with water, dried over anhydrous sodium sulfate, and filtered. The filtrate, freed of solvent by vacuum distillation, affords 3-(17β-hydroxy-3-oxoandrosta-4,6-dien-17α-yl)propionic acid lactone.

*Example 9*

Substitution of 520 parts of calcium carbonate for the lithium carbonate called for in Example 8 affords, by the procedure there detailed, 3-(17β-hydroxy-3-oxoandrosta-4,6-dien-17α-yl)propionic acid lactone.

*Example 10*

To a suspension of 300 parts of 3-(3β,17β-dihydroxy-androst-5-en-17α-yl)propionic acid lactone and 208 parts of magnesium oxide in 5670 parts of N,N-dimethylformamide at around 75° is added, portionwise with stirring during approximately 45 minutes, a solution of 296 parts of bromine in 2070 parts of dioxane. Stirring at around 75° is continued for about 1½ hours after addition of the bromine solution is complete, at which point the bulk of the solvent is removed under reduced pressure and the residue then cooled and consecutively diluted with 1000 parts of water, 1340 parts of dichloromethane, and 7130 parts of ether. Approximately 2620 parts of 10% hydrochloric acid is thereupon cautiously mixed in. The organic layer is separated, washed with water, dried over anhydrous sodium sulfate, and filtered. The filtrate, freed of solvent by vacuum distillation, affords 3-(17β-hydroxy-3-oxoandrosta-4,6-dien-17α-yl)propionic acid lactone. The yield is somewhat lower than in Example 3.

*Example 11*

Substitution of 385 parts of lithium carbonate for the magnesium oxide called for in Example 10 affords, by the procedure there detailed, 3-(17β-hydroxy-3-oxoandrosta-4,6-dien-17α-yl)propionic acid lactone.

*Example 12*

Substitution of 520 parts of calcium carbonate for the magnesium oxide called for in Example 10 affords, by the procedure there detailed, 3-(17β-hydroxy-3-oxoandrosta-4,6-dien-17α-yl)propionic acid lactone.

*Example 13*

Substitution of 936 parts of pyridine for the magnesium oxide called for in Example 10 affords, by the procedure there detailed, 3-(17β-hydroxy-3-oxoandrosta-4,6-dien-17α-yl)propionic acid lactone.

*Example 14*

Substitution of 1880 parts of N,N-dimethylformamide for the dioxane called for in Example 3 affords, by the procedure there detailed, 3-(17β-hydroxy-3-oxoandrosta-4,6-dien-17α-yl)propionic acid lactone. The yield is approximately the same as in Example 3.

*Example 15*

To a suspension of 300 parts of 3-(3β,17β-dihydroxy-androst-5-en-17α-yl)propionic acid lactone, 208 parts of magnesium oxide, and 400 parts of lithium bromide in 3540 parts of N,N-dimethylformamide at 95–100° is added, portionwise with stirring during approximately 45 minutes, a solution of 296 parts of bromine in 1180 parts of N,N-dimethylformamide. Stirring at 95–100° is continued for about 1½ hours after the addition of the bromine solution is complete, at which point, the bulk of the solvent is removed under reduced pressure and residue then cooled and consecutively diluted with 1000 parts of water, 1340 parts of dichloromethane, and 7130 parts of ether. Approximately 2620 parts of 10% hydrochloric acid is thereupon cautiously mixed in. The organic layer is separated, washed with water, dried over anhydrous sodium sulfate, and filtered. The filtrate, freed of solvent by vacuum distillation, affords 3-(17β-hydroxy-3-oxoandrosta-4,6-dien-17α-yl)propionic acid lactone in a yield slightly lower than in Example 14.

*Example 16*

Substitution of 2130 and 710 parts of N,N-dimethylformamide for the 3540 and 1180 parts thereof, respectively, called for in Example 15 affords, by the procedure there detailed, 3-(17β-hydroxy-3-oxoandrosta-4,6-dien-17α-yl)propionic acid lactone in a yield approximately the same as in Example 15.

*Example 17*

To a suspension of 300 parts of 3-(3β,17β-dihydroxyandrost-5-en-17α-yl)propionic acid lactone, 208 parts of magnesium oxide, and 150 parts of lithium bromide in approximately 2320 parts of N-methyl-2-pyrrolidone at approximately 75° is added, portionwise with stirring over a period of about 55 minutes, a solution of 296 parts of bromine in 710 parts of N,N-dimethylformamide. Upon completion of the addition, the mixture is stirred at 75–80° for 2 hours, then cooled. To the cooled reaction mixture is added a mixture of 3000 parts of concentrated hydrochloric acid and 5550 parts of ice. The resulting mixture is extracted with ether containing 10% dichloromethane. The extract is washed with water, dried over anhydrous sodium sulfate containing decolorizing charcoal, and filtered. From the filtrate, upon removal of solvent by vacuum distillation, a good yield of 3-(17β-hydroxy-3-oxoandrosta-4,6-dien-17a-yl)propionic acid lactone is obtained.

*Example 18*

Substitution of approximately 42 parts of androst-5-ene-3β,17β-diol for the 3-(3β,17β-dihydroxyandrost-5-en-17α-yl)propionic acid lactone called for in Example 2 affords, by the procedure there detailed, an excellent yield of 17β-hydroxyandrosta-4,6-dien-3-one melting at 197.5–200.5°.

*Example 19*

To a suspension of approximately 39 parts of epimeric 4-methylandrost-5-ene-3,17β-diol, 57 parts of lithium carbonate, and 57 parts of lithium bromide in 850 parts of N,N-dimethylformamide at 75–80° is added, portionwise with stirring during approximately 45 minutes, a soluton of approximately 41 parts of bromine in 330 parts of dioxane. Stirring at 75–80° is continued for about 2 hours after addition of the bromine is complete, at which point approximately 5000 parts of warm water is introduced. The resultant mixture is cooled at 5–10° while sufficient glacial acetic acid is slowly added to neutralize excess lithium carbonate. The precipitate which forms is removed by filtration and washed with water, then dried in vacuo to afford 17β-hydroxy-4-methylandrosta-4,6-dien-3-one in good yield.

*Example 20*

Substitution of approximately 42 parts of 3β-hydroxyandrost-5-en-17-one for the 3-(3β,17β-dihydroxyandrost-5-en-17α-yl)propionic acid lactone called for in Example 2 affords, by the procedure there detailed, an excellent yield of androsta-4,6-dien-3,17-dione. Recrystillization is facilitated by addition of hexane to the ethyl acetate. The purified product melts in the range 163–167°.

*Example 21*

Substitution of approximately 48 parts of 3β-acetoxyandrost-5-en-17-one for the 3-(3β,17β-dihydroxyandrost-5-en-17α-yl)propionic acid lactone called for in Example 2 affords, by the procedure there detailed, androsta-4,6-diene-3,17-dione.

*Example 22*

Substitution of approximately 45 parts of 3β-methoxyandrost-5-en-17-one for the 3-(3β,17β-dihydroxyandrost-5-en-17α-yl)propionic acid lactone called for in Example 2 affords, by the procedure there detailed, androsta-4,6-diene-3,17-dione.

*Example 23*

Substitution of approximately 42 parts of 3α-hydroxyandrost-5-en-17-one for the 3-(3β,17β-dihydroxyandrost-5-en-17α-yl)propionic acid lactone called for in Example 2 affords, by the procedure there detailed, androsta-4,6-diene-3,17-dione. The yield, as also the yields in Examples 21–22, is substantially less than that obtained by the procedure of Example 20.

*Example 24*

To a suspension of 22 parts of 17α-methylandrosta-5-ene-3β,17β-diol, 32 parts of lithium carbonate, and 32 parts of lithium bromide in 470 parts of N,N-dimethylformamide at 75° is added, portionwise with stirring during 1 hour, a solution of approximately 23 parts of bromine in 165 parts of dioxane. Upon completion of the addition, the mixture is stirred at 75–80° for about 2 hours, whereupon 2500 parts of warm water is mixed in. The mixture is cooled in an ice bath while sufficient glacial acetic acid is slowly added to neutralize excess lithium carbonate. The precipitate which forms is isolated by filtration, then taken up in ether. The ether solution is washed with water, dried over anhydrous sodium sulfate containing decolorizing charcoal, and filtered. From the filtrate, upon evaporation of the solvent, a good yield of 17β-hydroxy-17α-methylandrosta-4,6-dien-3-one is obtained.

*Example 25*

Substitution of 290 parts of 17α-propylandrost-5-ene-3β,17β-diol for the 3-(3β,17β-disydroxyandrost-5-en-17α-yl)propionic acid lactone called for in Example 3 affords, by the procedure there detailed, 17β-hydroxy-17α-propylandrosta-4,6-dien-3-one.

*Example 26*

Substitution of 23 parts of 17α-vinylandrost-5-ene-3β,17β-diol for the 17α-methylandrost-5-ene-3β,17β-diol called for in Example 24 affords, by the procedure there detailed, 17β-hydroxy-17α-vinylandrosta-4,6-dien-3-one.

*Example 27*

Substitution of 344 parts of 17α-(1-butenyl)-androst-5-ene-3β,17β-diol for the 3-(3β,17β-dihydroxy-androst-5-en-17α-yl)propionic acid lactone called for in Example 3 affords, by the procedure there detailed, 17α-(1-butenyl)-17β-hydroxyandrosta-4,6-dien-3-one.

*Example 28*

To a suspension of approximately 46 parts of 17α-ethynylandrost-5-ene-3β,17β-diol, 64 parts of lithium carbonate, and 64 parts of lithium bromide in 945 parts of N,N-dimethylformamide at 75–80° is added, portionwise with stirring during approximately 45 minutes, a solution of 46 parts of bromine in 330 parts of dioxane. Stirring at 75–80° is continued for about 2 hours after addition of the bromine is complete, at which point approximately 5000 parts of warm water is introduced. The resulting mixture is cooled at 5–10° while sufficient glacial acetic acid is slowly added to neutralize excess lithium carbonate. The precipitate which forms is isolated by filtration and washed with water, then dried in vacuo to afford an excellent yield of 17α-ethynyl-17β-hydroxyandrosta-4,6-dien-3-one which, upon recrystallization from acetone, melts at 254.5–261.5°.

Example 29

Substitution of 310 parts of 17α-(1-pentynyl)-androst-5-ene-3β,17β-diol for the 3-(3β,17β-dihydroxy-androst-5-en-17α-yl)propionic acid lactone called for in Example 3 affords, by the procedure there detailed, 17β-hydroxy-17α-(1-pentynyl)androsta-4,6-dien-3-one.

Example 30

Substitution of 331 parts of 17α-(6-hydroxy-hex-1-ynyl)androst-5-ene-3β,17β-diol for the 3-(3β,17β-dihydroxy-androst-5-en-17α-yl)propionic acid lactone called for in Example 3 affords, by the procedure there detailed, 17β-hydroxy - 17α-(6-hydroxyhex-1-ynyl)androsta-4,6-dien-3-one.

Example 31

Substitution of approximately 46 parts of 3β-hydroxypregn-5-en-20-one for the 17α-ethynylandrost-5-ene-3β,17β-diol called for in Example 28 affords, by the procedure there detailed, pregna-4,6-diene-3,20-dione melting at 144–146.5°.

Example 32

To a suspension of approximately 92 parts of 3β-hydroxypregn-5-en-20-one, 69 parts of magnesium oxide, and 50 parts of lithium bromide in 770 parts of N-methyl-2-pyrrolidone at 75–79° is added, portionwise with stirring during about 20 minutes, a solution of 102 parts of bromine in 240 parts of N,N-dimethylformamide. Upon completion of the addition, the mixture is stirred at 75–79° for about 1 hour, then cooled to room temperature and poured onto a mixture of 1830 parts of ice and 1000 parts of concentrated hydrochloric acid. The mixture thus obtained is extracted with a 1:5 mixture of ether and dichloromethane. The extract is washed with water, dried over anhydrous sodium sulfate containing decolorizing charcoal, and filtered. The filtrate is stripped of solvent by vacuum distillation to give a 93% yield of pregna-4,6-diene-3,20-dione.

Example 33

To a suspension of approximately 46 parts of 3β-hydroxypregna-5,16-dien-20-one, 64 parts of lithium carbonate, and 64 parts of lithium bromide in 945 parts of N,N-dimethylformamide at 75–80° is added, portionwise with stirring during approximately 45 minutes, a solution of 46 parts of bromine in 330 parts of dioxane. Stirring at 75–80° is continued for about 2 hours after addition of the bromine is complete, at which point approximately 5000 parts of warm water is introduced. The resulting mixture is cooled at 5–10° while sufficient glacial acetic acid is slowly added to neutralize excess lithium carbonate. The precipitate which forms is isolated by filtration and washed with water, then dried in vacuo to afford pregna-4,6,16-triene - 3,20 - dione which, upon recrystallization from a mixture of chloroform and acetone, melts at 241.5–245.5°.

Example 34

Substitution of approximately 48 parts of 16α,17α-epoxy-3β-hydroxypregn-5-en-20-one for the 17α-ethynylandrost-5-ene-3β,17β-diol called for in Example 28 affords, by the procedure there detailed, an excellent yield of 16α,17α-epoxypregn-4,6-diene-3,20-dione. The recrystallized product melts at 216.5–219° and has a specific rotation (referred to the D line of sodium and observed in chloroform solution) of +135°.

Example 35

Substitution of 324 parts of 17α-acetoxy-3β-hydroxypregn-5-en-20-one for the 3-(3β,17β-dihydroxyandrost-5-en-17α-yl)propionic acid lactone called for in Example 3 affords, by the procedure there detailed, 17α-acetoxypregna-4,6-diene-3,20-dione.

Example 36

To a suspension of approximately 56 parts of 17α-acetoxy-3β-hydroxy-6-methylpregn-5-en-20-one, 64 parts of lithium carbonate, and 64 parts of lithium bromide in 945 parts of N,N-dimethylformamide at 75–80° is added, portionwise with stirring during 45 minutes, a solution of approximately 46 parts of bromine in 330 parts of dioxane. Upon completion of the addition, the mixture is stirred at 75–80° for about 2 hours, then cooled to below 15° and maintained thereat while 105 parts of glacial acetic acid is introduced to neutralize excess carbonate. The precipitate which forms is 17α-acetoxy-6-methylpregna-4,6-diene-3,20-dione which, filtered off, dried in air, and further purified by trituration with ether followed by recrystallization from aqueous 50% ethanol, melts in the range 198.5–205°.

Example 37

To a suspension of 56 parts of cholest-5-en-3β-ol, 64 parts of lithium carbonate, and 64 parts of lithium bromide in 945 parts of N,N-dimethylformamide at 75–80° is added, portionwise with stirring during about 45 minutes, a solution of approximately 47 parts of bromine in 330 parts of dioxane. Upon completion of the addition, the mixture is stirred at 75–80° for 2 hours, whereupon 500 parts of warm water is mixed in. The mixture is cooled to 5–10° while sufficient glacial acetic acid is slowly added to neutralize excess lithium carbonate. The precipitate which forms is extracted with ether and the ether extract washed with water. The extract is then dried over anhydrous sodium sulfate containing decolorizing charcoal and filtered. From the filtrate, upon distillation of solvent under reduced pressure, cholesta-4,6-dien-3-one is obtained.

Example 38

Substitution of 56 parts of cholest-5-en-3α-ol for the cholest-5-en-3β-ol called for in Example 37 affords, by the procedure there detailed, cholesta-4,6-dien-3-one. The yield is substantially lower than in Example 37.

Example 39

Substitution of 30 parts of 24-ethylcholesta-5,22-dien-3β-ol for the 17α-methylandrost-5-ene-3β,17β-diol called for in Example 24 affords, by the procedure there detailed, an excellent yield of 24-ethylcholesta-4,6,22-trien-3-one.

Example 40

To a suspension of 102 parts of 17α-(3-hydroxyprop-1-ynyl)androst-5-ene-3β,17β-diol, approximately 73 parts of magnesium oxide, and 130 parts of lithium bromide in 1940 parts of N,N-dimethylformamide at 75–80° is added, portionwise with stirring over a period of about 30 minutes, a solution of 96 parts of bromine in 710 parts of dioxane. Upon completion of the addition, the mixture is stirred at 75° for about 1½ hours, then cooled. To the cooled mixture is added 250 parts of warm water and approximately 300 parts of concentrated hydrochloric acid. The mixture thus obtained is neutralized with tert-butylamine and evaporated to dryness. The residue is taken up in ethyl acetate; and the resulting solution is washed thoroughly with water, dried over anhydrous potassium carbonate, and freed of solvent by vacuum distillation. The residue is 17β-hydroxy-17α-(3-hydroxyprop-1-ynyl)androsta-4,6-dien-3-one

Example 41

Substitution of 24 parts of 3-(3β,17β-dihydroxyandrost-5-en-17α-yl)propiolic acid for the 17α-methylandrost-5-ene-3β,17β-diol called for in Example 24 affords, by the procedure there detailed, 3-(17β-hydroxy-3-oxoandrosta-4,6-dien-17α-yl)propiolic acid.

Example 42

Substitution of 60 parts of 22β-spirost-5-en-3β-ol for the 17-α-ethynylandrost-5-ene-3β,17β-diol called for in Example 28 affords, by the procedure there detailed, an excellent yield of 22β-spirosta-4,6-dien-3-one.

What is claimed is:

1. In a process for preparing 3-oxo-$\Delta^{4,6}$ steroids, the step which comprises contacting a 3-oxy-$\Delta^5$ steroid of the formula in rings A and B

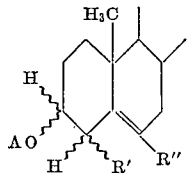

with at least about 4 gram-atoms of bromine per mole of the 3-oxy steroid and a hydrogen bromide acceptor selected from the group consisting of magnesium oxide, alkali and alkaline earth carbonates, pyridine, and quinoline in the presence of an inert, solvent medium, A in the formula being selected from the group consisting of hydrogen and the radicals, alkanoyl and alkyl, and R' and R'' each being selected from the group consisting of hydrogen and the methyl radical.

2. In a process for preparaing 3-oxo-$\Delta^{4,6}$ steroids, the step which comprises contacting a 3-oxy-$\Delta^5$ steroid of the formula in rings A and B

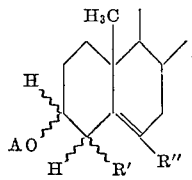

with at least about 4 gram-atoms of bromine per mole of the 3-oxy steroid in the presence of a hydrogen bromide acceptor selected from the group consisting of magnesium oxide, alkali and alkaline earth carbonates, pyridine, and quinoline; an inorganic bromide salt; and an inert solvent medium, A in the formula being selected from the group consisting of hydrogen and the radicals, alkanoyl and alkyl, and R' and R'' each being selected from the group consisting of hydrogen and the methyl radical.

3. In a process for preparing a 3-oxo-$\Delta^{4,6}$ steroid, the step which comprises heating a 3-oxy-$\Delta^5$ steroid of the formula in rings A and B

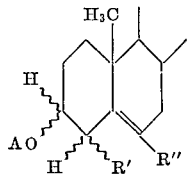

with at least about 4 gram-atoms of bromine per mole of the 3-oxy steroid and a hydrogen bromide acceptor selected from the group consisting of magnesium oxide, alkali and alkaline earth carbonates, pyridine, and quinoline in an inert, solvent medium, A in the formula being selected from the group consisting of hydrogen and the radicals, alkanoyl and alkyl, and R' and R'' each being selected from the group consisting of hydrogen and the methyl radical.

4. In a process for preparing a 3-oxo-$\Delta^{4,6}$ steroid, the step which comprises heating a 3-oxy-$\Delta^5$ steroid of the formula in rings A and B

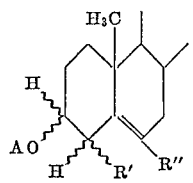

with at least about 4 gram-atoms of bromine per mole of the 3-oxy steroid in the presence of a hydrogen bromide acceptor selected from the group consisting of magnesium oxide, alkali and alkaline earth carbonates, pyridine, and quinoline; an inorganic bromide salt; and an inert solvent medium, A in the formula being selected from the group consisting of hydrogen and the radicals, alkanoyl and alkyl, and R' and R'' each being selected from the group consisting of hydrogen and the methyl radical.

5. In a process for preparing a 3-oxo-$\Delta^{4,6}$ steroid, the step which comprises heating a 3-oxy-$\Delta^5$ steroid of the formula in rings A and B

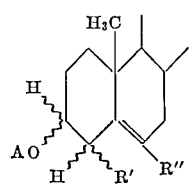

with at least 4 gram-atoms of bromine per mole of the 3-oxy steroid and a hydrogen bromide acceptor selected from the group consisting of magnesium oxide, lithium carbonate, and calcium carbonate in the presence of an inert, solvent, N-substituted amide, A in the formula being selected from the group consisting of hydrogen and the radicals, alkanoyl and alkyl, and R' and R'' each being selected from the group consisting of hydrogen and the methyl radical.

6. In a process for preparing a 3-oxo-$\Delta^{4,6}$ steroid, the step which comprises heating a 3-oxy-$\Delta^5$ steroid of the formula in rings A and B

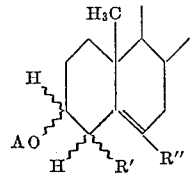

with at least 4 gram-atoms of bromine per mole of the 3-oxy steroid in the presence of a hydrogen bromide acceptor selected from the group consisting of magnesium oxide, lithium carbonate, and calcium carbonate; lithium bromide; and an inert solvent selected from the group consisting of N,N dimethylformamide, N,N-dimethylacetamide, N,N-diethylacetamide, N-methyl-2-pyrrolidone, N-formylpiperidine, and mixtures thereof optionally including dioxane, A in the formula being selected from the group consisting of hydrogen and the radicals, alkanoyl and alkyl, and R' and R'' each being selected from the group consisting of hydrogen and the methyl radical.

7. In a process for preparing 3-(17β-hydroxy-3-oxo-androsta-4,6-dien-17α-yl)propionic acid lactone, the step which comprises heating 3-(3β,17β-dihydroxy-androst-5-en-17α-yl)propionic acid lactone with at least 4 gram-atoms of bromine per mole of the 3-hydroxy lactone in the presence of a hydrogen bromide acceptor selected from the group consisting of magnesium oxide, lithium carbonate, and calcium carbonate; an inorganic bromide salt; and an inert solvent selected from the group consisting of N,N- dimethylformamide, N,N-dimethylacetamide, N,N-diethylacetamide, N-methyl-2-pyrrolidone, N-formylpiperidine, and mixtures thereof optionally including dioxane.

8. In a process for preparing 3-(17β-hydroxy-3-oxo-androsta-4,6-dien-17α-yl)propionic acid lactone, the step which comprises heating 3-(3β,17β-dihydroxyandrost-5-en-17α-yl)propionic acid lactone with 4 gram-atoms of bromine per mole of the 3-hydroxy lactone in the presence of a hydrogen bromide acceptor selected from the group consisting of magnesium oxide and lithium carbonate, lithium bromide, and an inert solvent selected from the group consisting of N,N-dimethylformamide and N-methyl-2-pyrrolidone at temperatures in the range, 75–105° C.

9. In a process for preparing a steroid of the formula

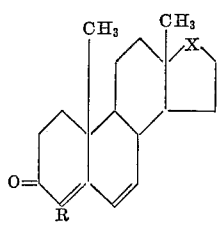

wherein R is selected from the group consisting of hydrogen and the methyl radical, X is selected from the group consisting of the radicals carbonyl, β-hydroxymethylene, α-alkyl-β-hydroxymethylene, α-alkenyl-β-hydroxymethylene, α-alkynyl-β-hydroxymethylene, α-hydroxyalkynyl-β-hydroxymethylene, and α-carboxyalkynyl-β-hydroxymethylene, the step which comprises heating a corresponding 3-hydroxy-Δ⁵ steroid of the formula

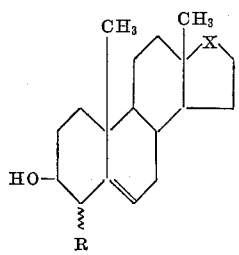

wherein R and X are defined as before, with at least 4 gram-atoms of bromine per mole of the 3-hydroxy-Δ⁵ steroid in the presence of a hydrogen bromide acceptor selected from the group consisting of magnesium oxide, lithium carbonate, and calcium carbonate; an inorganic group consisting of N,N-dimethylformamide, N,N-dimethylacetamide, N,N-diethylacetamide, N-methyl-2-pyrrolidone, N-formylpiperidine, and mixtures thereof optionally including dioxane.

10. In a process for preparing a steroid of the formula

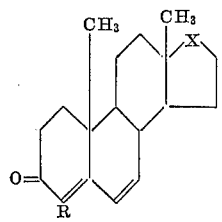

wherein R is selected from the group consisting of hydrogen and the methyl radical and X is selected from the group consisting of the radicals carbonyl, β-hydroxymethylene, α-alkyl-β-hydroxymethylene, α-alkenyl-β-hydroxymethylene, α - alkynyl-β-hydroxymethylene, α-hydroxyalkynyl-β-hydroxymethylene, and α-carboxyalkynyl-β-hydroxymethylene, the step which comprises heating a corresponding 3-hydroxy-Δ⁵ steroid of the formula

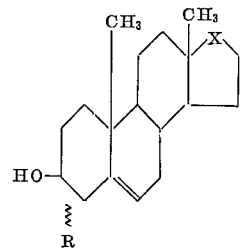

wherein R and X are defined as before, with 4 gram-atoms of bromine per mole of the 3-hydroxy-Δ⁵ steroid in the presence of a hydrogen bromide acceptor selected from the group consisting of magnesium oxide and lithium carbonate, lithium bromide and an inert solvent selected from the group consisting of N,N-dimethylformamide and N-methyl-2-pyrrolidone at temperatures in the range, 75–105° C.

11. In a process for preparing a compound selected from the group consisting of steroids of the formula

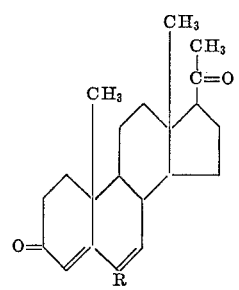

and 17α-alkanoyloxy, 16,17-dehydro, and 16α17α-epoxy steroids otherwise identical wherein R is selected from the group consisting of hydrogen and the methyl radical, the step which comprises heating a corresponding member of the group consisting of 3-hydroxy-Δ⁵ steroids of the formula

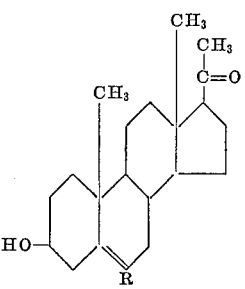

and 17α-alkanoyloxy, 16,17-dehydro and 16α,17α-epoxy steroids otherwise identical wherein R is defined as before with at least 4 gram-atoms of bromide per mole of the 3-hydroxy-Δ⁵ steroid in the presence of a hydrogen bromide acceptor selected from the group consisting of magnesium oxide, lithium carbonate, and calcium carbonate; an inorganic bromide salt; and an inert solvent selected from the group consisting of N,N-dimethylformamide, N,N-dimethylacetamide, N,N-diethylacetamide, N-methyl-2-pyrrolidone, N-formylpiperidine, and mixtures thereof optionally including dioxane.

12. In a process for preparing a compound selected from the group consisting of steroids of the formula

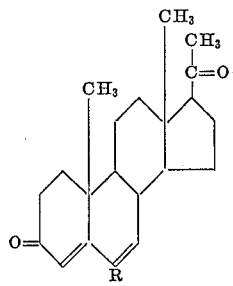

and 17α-alkanoyloxy, 16,17-dehydro, and 16α,17α-epoxy steroids otherwise identical wherein R is selected from the group consisting of hydrogen and the methyl radical, the step which comprises heating a corresponding member of the group consisting of 3-hydroxy-$\Delta^5$ steroids of the formula

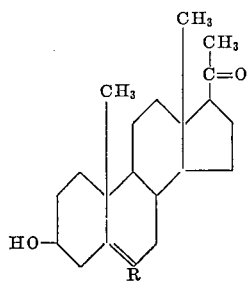

and 17α-alkanoyloxy, 16,17-dehydro, and 16α,17α-epoxy steroids otherwise identical wherein R is defined as before with 4 gram-atoms of bromine per mole of the 3-hydroxy-$\Delta^5$ steroid in the presence of a hydrogen bromide acceptor selected from the group consisting of magnesium oxide and lithium carbonate, lithium bromide, and an inert solvent selected from the group consisting of N,N-dimethylformamide and N-methyl-2-pyrrolidone at temperatures in the range, 75–105°.

13. In a process for preparing pregna-4,6-diene-3,20-dione, the step which comprises heating 3β-hydroxy-pregn-5-en-20-one with at least 4 gram-atoms of bromine per mole of the 3-hydroxy steroid in the presence of a hydrogen bromide acceptor selected from the group consisting of magnesium oxide, lithium carbonate, and calcium carbonate; an inorganic bromide salt; and an inert solvent selected from the group consisting of N,N-dimethylformamide, N,N-dimethylacetamide, N,N-diethylacetamide, N-methyl-2-pyrrolidone, N-formylpiperidine, and mixtures thereof optionally including dioxane.

14. In a process for preparing pregna-4,6-diene-3,20-dione, the step which comprises heating 3β-hydroxypregn-5-en-20-one with 4 gram-atoms of bromine per mole of the 3-hydroxy steroid in the presence of a hydrogen bromide acceptor selected from the group consisting of magnesium oxide and lithium carbonate, lithium bromide, and an inert solvent selected from the group consisting of N,N-dimethylformamide and N-methyl-2-pyrrolidone at temperatures in the range, 75–105° C.

15. In a process for preparing 22β-spirosta-4,6-dien-3-one, the step which comprises heating 22β-spirost-5-en-3β-ol with at least 4 gram-atoms of bromine per mole of the 3-hydroxy steroid in the presence of a hydrogen bromide acceptor selected from the group consisting of magnesium oxide, lithium carbonate, and calcium carbonate; an inorganic bromide salt; and an inert solvent selected from the group consisting of N,N-dimethylformamide, N,N-dimethylacetamide, N,N-diethylacetamide, N-methyl-2-pyrrolidone, N-formylpiperidine, and mixtures thereof optionally including dioxane.

16. In a process for preparing 22β-spirosta-4,6-dien-3-one, the step which comprises heating 22β-spirost-5-en-3β-ol with 4 gram-atoms of bromine per mole of the 3-hydroxy steroid in the presence of a hydrogen bromide acceptor selected from the group consisting of magnesium oxide and lithium carbonate, lithium bromide, and an inert solvent selected from the group consisting of N,N-dimethylformamide and N-methyl-2-pyrrolidone at temperatures in the range, 75–105° C.

17. In a process for preparing cholesta-4,6-dien-3-one, the step which comprises heating cholest-5-en-3-ol with at least 4 gram-atoms of bromine per mole of the 3-hydroxy steroid in the presence of a hydrogen bromide acceptor selected from the group consisting of magnesium oxide, lithium carbonate, and calcium carbonate; an inorganic bromide salt; and an inert solvent selected from the group consisting of N,N-dimethylformamide, N,N-dimethylacetamide, N,N - diethylacetamide, N - methyl-2-pyrrolidone, N-formylpiperidine, and mixtures thereof optionally including dioxane.

18. In a process for preparing cholesta-4,6-dien-3-one, the step which comprises heating cholest-5-en-3β-ol with 4 gram-atoms of bromine per mole of the 3-hydroxy steroid in the presence of a hydrogen bromide acceptor selected from the group consisting of magnesium oxide and lithium carbonate, lithium bromide, and an inert solvent selected from the group consisting of N,N-dimethylformamide and N-methyl-2-pyrrolidone at temperatures in the range, 75–105° C.

19. In a process for preparing 24-ethylcholesta-4,6,22-trien-3-one, the step which comprises heating 24-ethylcholesta-5,22-dien-3β-ol with at least 4 gram-atoms of bromine per mole of the 3-hydroxy steroid in the presence of a hydrogen bromide acceptor selected from the group consisting of magnesium oxide, lithium carbonate, and calcium carbonate; an inorganic bromide salt; and an inert solvent selected from the group consisting of N,N-dimethylformamide, N,N - dimethylacetamide, N,N - diethylacetamide, N-methyl-2-pyrrolidone, N-formylpiperidine, and mixtures thereof optionally including dioxane.

20. In a process for preparing 24-ethylcholesta-4,6,22-trien-3-one, the step which comprises heating 24-ethylcholesta-5,22-dien-3β-ol with 4 gram-atoms of bromine per mole of the 3-hydroxy steroid in the presence of a hydrogen bromide acceptor selected from the group consisting of magnesium oxide and lithium carbonate, lithium bromide, and an inert solvent selected from the group consisting of N,N-dimethylformamide and N-methyl-2-pyrrolidone at temperatures in the range, 75–105° C.

No references cited.

LEWIS GOTTS, *Primary Examiner.*